United States Patent [19]  [11] 4,153,004
Barnert  [45] May 8, 1979

[54] GAS-FEED NOZZLE FOR A PYROLYTIC PARTICLE COATING APPARATUS

[75] Inventor: Eike Barnert, Jülich, Fed. Rep. of Germany

[73] Assignee: Kernforschungsanlage Jülich Gesellschaft mit beschrankter Haftung, Jülich, Fed. Rep. of Germany

[21] Appl. No.: 770,299

[22] Filed: Feb. 22, 1977

[30] Foreign Application Priority Data

Mar. 20, 1976 [DE] Fed. Rep. of Germany ....... 2611844

[51] Int. Cl.² .............................................. B01J 8/24
[52] U.S. Cl. ................................. 118/48; 118/DIG. 5
[58] Field of Search ...................... 118/48, 49, DIG. 5

[56] References Cited

U.S. PATENT DOCUMENTS

| 3,063,860 | 11/1962 | Gemmer | 118/DIG. 5 |
|---|---|---|---|
| 3,398,718 | 8/1968 | Pilloton | 118/48 |
| 3,593,775 | 7/1971 | Privott, Jr. | 118/49 UX |
| 3,636,923 | 1/1972 | McCreary et al. | 118/DIG. 5 UX |
| 3,800,740 | 4/1974 | Robinson | 118/Dig. 5 X |
| 4,008,685 | 2/1977 | Pierce | 118/DIG. 5 X |
| 4,011,832 | 3/1977 | Westervelt et al. | 118/DIG. 5 X |

FOREIGN PATENT DOCUMENTS 1808550 6/1974 Fed. Rep. of Germany.
413138 12/1966 Switzerland.

Primary Examiner—Wm. Carter Reynolds
Attorney, Agent, or Firm—Frishauf, Holtz, Goodman & Woodward

[57] ABSTRACT

An inner tube through which the coating gas is supplied terminates short of the end of the outer tube which forms an annular channel around the inner tube for supply of the carrier gas, so that a chamber is formed between the ends of these channels and the connection of the outer tube to the bottom of the heated reaction container. A constriction is provided where the outer tube joins the reaction container with its aperture aligned with the common axis of the two gas supply tubes. The position of the end of the inner tube is adjustable to suit the particular gas feed rate. The inner tube never reaches the temperature at which the coating gas decomposes. The upper portion of the outer tube, particularly at the constriction, is at or above that temperature, but the flow of carrier gas along the hot surfaces prevents the deposit of a coating on these surfaces. A porous barrier in the annular channel assures a uniform velocity profile of the carrier gas, so that in the nozzle and even in the lowermost part of the reactor it will sheathe the stream of coating gas.

15 Claims, 3 Drawing Figures

GAS-FEED NOZZLE FOR A PYROLYTIC PARTICLE COATING APPARATUS

This invention concerns a gas feed nozzle for supplying a decomposable coating-producing gas and also a carrier gas to an apparatus for the coating of fuel kernels for a nuclear reactor, and more particularly, to gas feed nozzles of that type provided at the bottom of the reaction container of a fluidized-bed coating apparatus.

The coating-producing gas and the carrier gas that is generally necessary to be used with the coating-producing gas in the coating of the kernel form fuel and breeder elements of a nuclear reactor are commonly provided in coaxial piping, in which a central channel serves to lead the decomposable gas that provides the coating and an annular channel coaxial with the central channel serves to lead the carrier gas to the coating apparatus.

Fuel and/or breeder material kernels of a diameter of a few hundred microns made for use in a nuclear reactor are coated with a suitable material in order to prevent or mitigate the giving off of fission products. According to a known coating process, the kernels are treated in the turbulent layer of a fluidized bed with one or more thermally decomposable gas or gases, such as methane, acetylene, propane, propylene, chlormethylsilane, molybdenum-V-chloride ($MoCl_5$) or the like, as well as a carrier gas that is suitable because under the reaction conditions it is inert, for example, argon, helium, hydrogen, nitrogen or carbon monoxide. The reaction temperature is between 1000° and 2200° C. The fluidized bed reactor consists of a double-walled water-cooled cylindrical vessel preferably arranged for heating electrically by resistance heating or inductive heating, with a reaction tube or fluidized bed tube provided within the vessel. The turbulent layer is formed in the fluidized bed tube which is made of graphite because of the temperature at which the pyrolysis is intended to take place. The gases required for the pyrolysis, including any necessary carrier gas for dilution of the pyrolytic gas, are supplied to the fluidized bed through a nozzle by which the supplied gas must be so distributed that the kernels of fuel or breeder material are held in a circulating movement, so that all kernels of fuel or of breeder material are evenly coated.

Various constructions of feed nozzles are known. For example, one is known in the shape of a capillary which leads into a generally conical fluidized bed tube (see Melvin F. Browning, Dale A. Vaughan, Joseph F. Dettore, John M. Blocher, Jr.: Characterization of Pyrolytic-Carbon Fuel Particles Coating prepared with Acetylene, Battelle Memorial Institute, Rep.-No. BMI-1735, 1965, A1, A2). It is also known to use for the nozzle a tube that is connected to the conical end of the fluidized bed tube after the fashion of a ball and socket joint. Nozzles with a single opening have the disadvantage, however, that at higher coating temperatures deposits are formed on the conical walls of the fluidized bed tube, as the result of which the flow characteristics are seriously impaired and occasionally even stopping up of the nozzle is caused.

In order to avoid these disadvantages, nozzles have been developed in which several openings are provided. According to one known form, the nozzle in this case consists of a molybdenum tube with a tapered down end, that serves for supply of carrier gas and coating gas, while bores are provided concentrically in the conical part of the fluidized bed tube through which an inert gas—conveniently the same gas that also is used as the carrier gas—is supplied into the fluidized bed tube, in order to mitigate the deposit of solid materials (see H. Beutler, G. B. Redding, J. R. G. Gough: Development of Coated Particles, Fuel Element Symposium, 1963, Rep. 151).

Further types of known nozzles exist for which in the supply of coating and carrier gas a central opening is provided, while for additional quantities of carrier gas, bores arranged coaxially with the central opening are also provided (R. L. Pilloton, J. A. Carpenter: Motion of Particles in Fluidized Beds and Implications for the Preparation of Coated Nuclear Fuel Particles, Oak Ridge National Laboratory TM-1170-1965), or in which a porous plate is used that can be regarded as an arrangement of countless small nozzles arranged next to each other (H. Bildstein, P. Koss: Coated Particles, Beschichtete Teilchen, Jahresbericht 1965, Reaktorzentrum Seibersdorf, Österreichische Studiengesellschaft für Atomenergie mbH). In the case of nozzles with several openings, it has been found, however, that small bores arranged alongside the main opening get stopped up after a relatively short period of use in spite of intensive cooling.

Other forms of known nozzles consist of providing a ring gap encircling a central opening that serves for supply of the coating gas, the carrier gas being blown into the fluidized bed through the ring gap (see R. L. Bickerdicke et al.: Studies on Coated Particle Fuel Involving Coating, Consolidation and Evaluation, D. P. Report 139, 1963 and R. L. R. Lefevre et al.: The choice of Pyrocarbon Deposition Agent for Nuclear Fuel Particles, D. P. Report 800, 1972). Furthermore, German patent No. 1,808,550 discloses a nozzle for the supply of gases that is made of graphite in which a central channel is provided for the decomposable gases and a surrounding annular channel coaxial to the central channel serves for supply of the carrier gases. These approaches do not overcome the problem, however, that parts of the nozzle structure that are exposed to the decomposition temperature for the coating gases come into contact with the coating gases. Layer growths and even stoppages are not to be avoided even with these last-mentioned nozzles.

It is an object of the present invention to supply a feed nozzle apparatus for the supply of gases in which the formation of deposits on parts of the nozzle structure, and hence a stopping up of the nozzle, is prevented.

SUMMARY OF THE INVENTION

Briefly, the outer tube of the annular channel is extended beyond the month of the inner tube that supplies the decomposable coating gas and a constriction is provided located at least in part within the end of the outer tube that connects to the gas feed orifice of the coating chamber, so that the adjacent ends of the separate central and annular channels are spaced from the constriction. The constriction constitutes a nozzle for the end of the outer tube and has a portion of minimum aperture which provides a central opening, for exit of gas from the outer tube, through which the coating-producing gas flows within a similarly moving sheath of carrier gas that flushes the surface of the nozzle construction.

The orifice of the central channel from which the coating gas streams out lies well inside the nozzle structure, since it is spaced away from the constriction at the entrance to the fluidized bed as the result of the outer tube extending axially beyond the mouth of the inner tube is therefore at a lower temperature than that which is necessary for decomposition of the coating gas. A formation of a deposit at the orifice of the central channel and on the parts forming that orifice is therefore not possible. Furthermore, the laminar stream of coating gas issuing from the central channel towards the middle of the constriction is laterally surrounded by the similarly directed laminar stream of carrier gas stream coming out of the annular channel and is therefore kept away by the carrier gas stream from the nozzle configuration of the walls that lead towards the place of minimum aperture of the constriction, so that the formation of deposits on the remaining portions of the nozzle is also prevented. This holds in particular for the portions of the nozzle forming the constriction, which are actually at a temperature high enough for the decomposition of the coating gas. In this connection, it has been found desirable to provide a sharply inwardly-running edge surface for the upstream side of the constriction, culminating, for example, in an annular inward cusp. Preferably the direction of gas flow is vertically upward, so that the lower or under side of the constriction, which preferably has a concavely curved transition surface leading to the cusp, is the upstream side of the constriction The upper (i.e., downstream) surface of the constriction preferably has a downstream upwardly widening flare above the place of minimum aperture, which widens out at a rate substantially greater than that at which the portion of the reaction container immediately thereabove gradually widens.

An advantageous further development of the nozzle according to the invention provides an inner tube for the central channel which is at least in part axially shiftable, so that the axial position of at least an end portion of the tube, and hence also of the end of this tube, can be adjusted. In this way, it is possible to set a spacing between the constriction and the downstream ends (i.e., the upper ends in the usual case) of the separate central channel and of its surrounding annular channel, which is optimal for the particular conditions that may be produced by operations at a particular rate of gas delivery into the fluidized bed, which is of course a process variable.

A further advantageous development of the nozzle apparatus according to the invention consists of insertion of means for providing an evenly distributed velocity profile of gas leaving the annular channel, such means being preferably provided in the form of a porous barrier in the annular channel. Thus, a surrounding layer of carrier gas of uniform velocity profile is provided around the central stream of coating gas. The porous barrier in this case may be regarded as defining the upstream boundary (i.e., usually the lower boundary) of an end portion of the annular channel in which end portion a laminar flow of carrier gas is established.

The invention is further described by way of example with reference to the accompanying drawing, in which.

Figure 3:
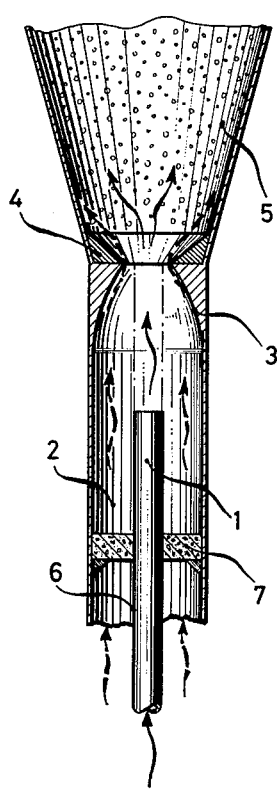
FIG. 3 is a cross-section through a nozzle apparatus in which the intervening space has an enclosure of streamline form.
Figure 1:
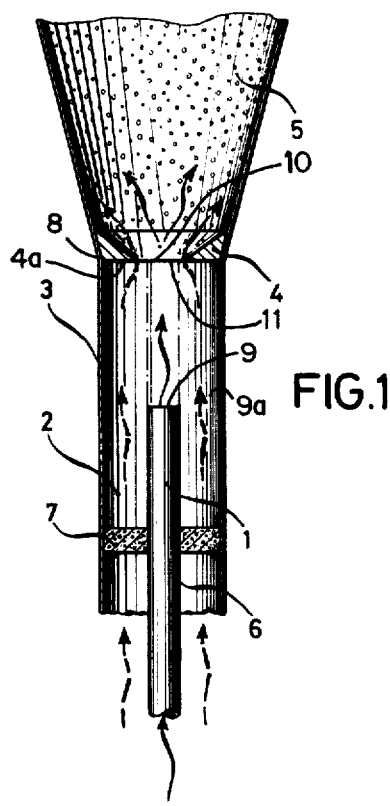
Figure 2:
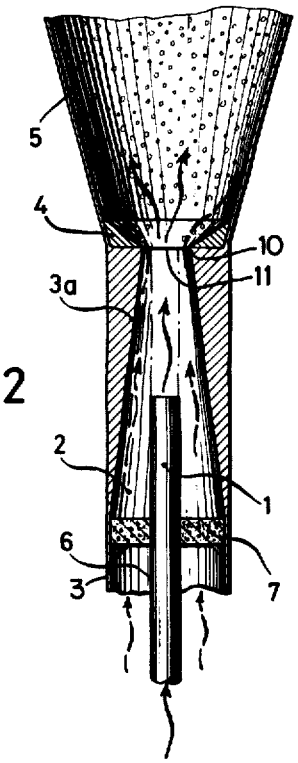
Figure 3:
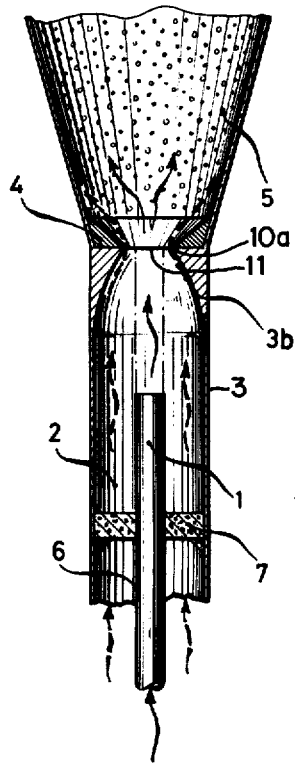

As shown in the drawing, the nozzle apparatus in each case has a central channel 1 inside an inner tube 6 and an annular channel 2 surrounding the central tube and bounded on the outside by an outer tube 3. The outer tube extends beyond the mouth of the inner tube 6 and ends at 8 in a constriction 4 where it fits in an orifice in the lower end of the fluidized bed container 5 that is only partly shown in the drawing. The minimum aperture of the opening 11 through the constriction 4 is so chosen that no fuel kernel or moderator material kernel can drop down into the inside of the nozzle apparatus at the lowest gas delivery rate to be used, which is easily provided, for example, with an aperture of 6 mm diameter, when kernels of a diameter of a few hundred microns are in the apparatus.

The constriction 4 constitutes a nozzle for the end 8 of the outer tube and has a portion 10 of minimum aperture which provides a central opening 11 for exit of gas from the outer tube 3.

As is further evident from the drawing, by virtue of the extension of the tube 3 beyond the mouth of the inner tube 6, the upper end 9 of the central channel 1 inside the tube 6 and the adjacent upper end **9*a* of the annular channel 2 between the tubes 6 and 3 are spaced up-stream (i.e., downwards) from the constriction 4. In other words, the illustrated end of the inner tube 6 terminates short of the corresponding end of the outer tube 3. The tube 6 that forms the central channel 1 on this account is not at a temperature high enough for producing the decomposition of the coating gas. The cross-section of the central channel 1 within the portion of the inner tube 6** shown in each of the figures of the drawing, namely the end portion of the tube, is substantially constant.

The stream of coating gas issuing out of the central channel 1 and also the stream of carrier gas issuing out of the annular channel 2 proceed by laminar flow in separate stream paths, although in contact with each other, to the constriction 4, so that the material of the constriction structure is flushed by a gas consisting only of the inert carrier gas. In order that the gas velocity of the carrier gas issuing from the annular channel 2 may be evenly distributed (i.e. equalized), an annular plate 7 of porous graphite or sintered metal is provided as a grid in the annular channel, at the same time serving as a positioning member for centering the central tube 6 that is shiftable in the axial direction. Means for shifting either the entire tube 6 or an end portion thereof are shown at 12 in FIG. 3 in a symbolic manner. A wide variety of such means can be provided, not only mechanically, but also magnetically with permanent magnets, or electromagnetically, for instance.

Since the carrier gas is forced to flow through the porous layer 7, a highly uniform velocity profile in the carrier gas stream is obtained.

The portion of the outer tube 3 between the position of the porous plate 7 and the throat 11 of the constriction 4 can have various shapes internally. FIG. 1 shows a structure in which the end of the tube 3 is cylindrical right up to a substantially flat bottom upstream surface **4*a* of the constriction 4. FIG. 2, on the other hand, shows a structure in which this end portion of the outer tube 3 gradually narrows as shown at 3*a* from the porous plate 7, in conical form, up to the narrowest part of the constriction 4, thus providing a conical lower upstream portion for the constriction 4 that extends to a place on the inner wall of the outer tube 3 that is upstream of the mouth of the inner tube 6**. Its lower end, adjacent to the porous plate 7, is well upstream of the end of the tube 6. In the form shown in FIG. 3, the inside of the tube 3 remains cylindrical for some distance past the mouth 9 of the tube 6 and then concavely narrows 3b to a cusp 10a at the narrowest part of the constriction 4. The downstream (upper) side of the constriction in all of these illustrated embodiments widens (flares) quite sharply (i.e. it has a high axial rate of flare) until the cross-sectional area is about the same as that of the outer tube 3 upstream of (below) the beginning of the constriction. In other words, the portion of the container 5 immediately above the nozzle constriction has an internal cross-sectional area not substantially smaller than that of the outer tube 6. Above the downstream flare of the nozzle constriction the cross-sectional area, now relating to the construction of the fluidized bed container, widens upward much more gradually.

The aperture of the constriction preferably has an area which ranges from 1 to 2.5 times the cross-sectional area of the central channel 1.

The inside diameter of the outer tube 3 preferably has a diameter 5 to 10 times the diameter of the central channel 1. However, the inner diameter of the outer tube 3 has to be such that for a needed flow rate of carrier gas the flow of the carrier gas in the annular channel 2 is laminar.

Figure 1:
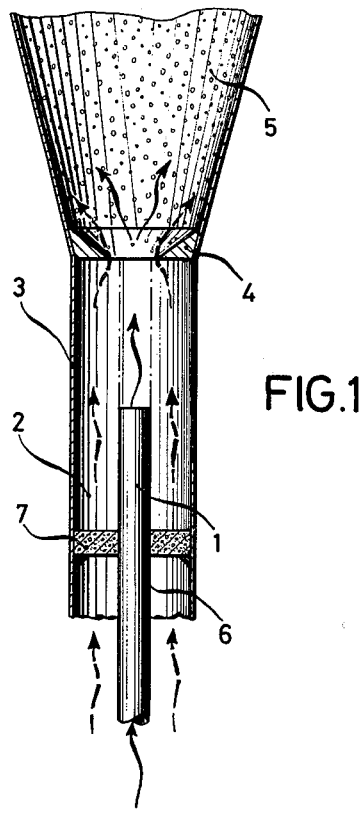
FIG. 1 is a cross-section a nozzle apparatus of with a cylindrical space between the end of the central channel and the constriction of the nozzle.
Figure 2:
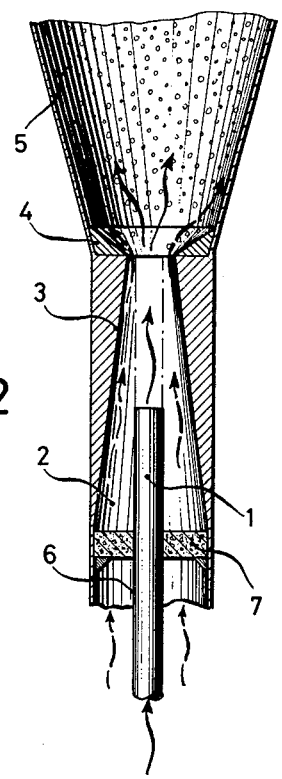
FIG. 2 is a cross-section of a nozzle apparatus with a corresponding intervening space of conical shape.

The spacing between the end of the tube (6) and the place of smallest cross-sectional area of the constriction 4 as shown in FIG. 1, is preferably 5 to 40 times the diameter of the central channel 1. In case tubes of non-circular cross-section are used for the tube 6, these relations would be referred to the minimum inside width of the tube.

For materials for the tube 3 and likewise for the inner tube 6, or at least their end portions shown in the present drawing, firm graphite material is preferable. For the inner tube 6 also metals of high thermal stability such as temperature resistant steel of the American designations AISI 309 or AISI 810 may be used.

Although the invention has been described by reference to particular illustrative embodiments, modifications or variations are possible within the inventive concept.

I claim:

1. A gas feed nozzle apparatus for supplying a decomposable coating-producing gas and a carrier gas to an apparatus for the coating of fuel and/or breeder kernels for use in a nuclear reactor, comprising:
    an inner tube (6) the interior of which forms a central channel (1) for supply of said coating-producing gas, said central channel having an end portion of substantially constant cross-section all the way to the exit mouth (9) of said inner tube (6);
    an outer tube (3) coaxially surrounding said inner tube (6) and having a portion coaxially extending beyond said mouth (9) of said inner tube, said outer and inner tubes forming between them for the length of their overlap, an annular channel (2) for said carrier gas, the portion of said outer tube (3) extending beyond said mouth of said inner tube (6) providing a space for maintaining a laminar stream of said carrier surrounding and in contact with a central laminar stream of said coating-producing gas flowing in the same direction out of said central channel between said inner and outer tubes, said inner tube having an end that terminates the tube short of the corresponding end of said outer tube;
    a container (5) of said coating apparatus having an orifice connected to the exit end of said outer tube;
    a constriction (4) of the inner wall of said outer tube located at least in part at said end (8) of said outer tube (3) so as to constitute a nozzle for the end of said outer tube and having a portion of minimum aperture which provides a central opening for exit of gas from said extending portion of said outer tube, whereby said coating-producing gas is caused to flow therethrough within a similarly moving sheath of said carrier gas that flushes the surface of constriction, the portion of said container of said coating apparatus immediately above said constriction having an internal cross-sectional area not substantially smaller than that of said outer tube below said constriction.

2. A gas feed nozzle apparatus as defined in claim 1, in which said tubes (6, 3) are substantially vertical and cylindrical at least in their portions near the exit ends thereof, and in which said coating apparatus is a fluidized bed apparatus and in which, further, said orifice of its container (5) is at or in the bottom of said container.

3. A gas feed nozzle apparatus as defined in claim 2, in which said constriction has an upstream edge surface running sharply inward to said portion of minimum aperture.

4. A gas feed nozzle apparatus as defined in claim 2, in which said inner tube (6) has an end portion of which the axial position is adjustable and means (12) are provided for shifting said end portion of said inner tube axially and thereby adjusting the position of said mouth of said inner tube (6).

5. A gas feed nozzle apparatus as defined in claim 2, in which said annular channel has an end portion coming to a downstream end peripherally adjacent to said mouth of said inner tube and said end portion of said annular channel also has an upstream boundary at the upstream end of said portion, and in which means (7) for equalizing the velocity profile of said carrier gas in said end portion of said annular channel (2) are provided at said upstream boundary of said end portion of said annular channel.

6. A gas feed nozzle apparatus as defined in claim 5, in which said velocity profile equalizing means (7) is an annular porous barrier interposed in said annular channel between said inner and outer tubes and serving to center said inner tube inside said outer tube.

7. A gas feed nozzle apparatus as defined in claim 2, in which said constriction has a downstream upwardly widening flare above its said portion of minimum aperture and in which the portion of said container (5) immediately above said downstream upwardly widening flare of said constriction gradually widens upward at a rate substantially lower than that of said downstream upwardly widening flare of said constriction.

8. A gas feed nozzle apparatus as defined in claim 2, in which said constriction (4) has an upstream, lower surface that is at least approximately flat and the space therebelow contained by said outer tube above said end of said inner tube (6) is cylindrical.

9. A gas feed nozzle apparatus as defined in claim 2, in which said portion of minimum aperture of said constriction (4) has a shape providing an inwardly directed annular cusp and said constriction also has an upstream, lower surface that provides a concavely curved transition from the cylindrical inner surface of said outer tube (3) to said annular cusp.

10. A gas feed nozzle apparatus as defined in claim 7, in which said constriction has a lower, upstream, surface having an axial rate of constriction substantially less than the axial rate of flare of said downstream upwardly widening flare of the construction.

11. A gas feed nozzle apparatus as defined in claim 10, in which said outer tube has a cylindrical inner wall and in which said lower, upstream surface of said constriction is substantially conical and extends to a place on the inner wall of said outer tube (3) which is upstream of said mouth of said inner tube (6).

12. A gas feed nozzle apparatus as defined in claim 2, in which the cross-sectional area of said central opening provided by said portion of minimum aperture of said constriction is 1 to 2.5 times the cross-sectional area of said central channel (1) in said inner tube (6).

13. A gas feed nozzle apparatus as defined in claim 12, in which the inside diameter of said outer tube (3) is from 5 to 10 times the diameter of said central channel (1) in said inner tube (6).

14. A gas feed nozzle apparatus as defined in claim 13, in which the axial distance from the end of said inner tube (6) to said portion of minimum aperture of said constriction (4) is greater than 5 times the minimum inside diameter of said central channel (1) in said inner tube (6).

15. A gas feed nozzle apparatus as defined in claim 14, in which said axial distance is not greater than 40 times the minimum inside diameter of said central channel (1) in said inner tube (6).

* * * * *

UNITED STATES PATENT AND TRADEMARK OFFICE
CERTIFICATE OF CORRECTION

PATENT NO. : 4,153,004

DATED : May 8, 1979

INVENTOR(S) : EIKE BARNERT

It is certified that error appears in the above-identified patent and that said Letters Patent are hereby corrected as shown below:

Column 2:

line 8, at the end of the line, replace "in the" with --for the--;

line 54, replace "month" with --mouth--;

line 65, "construction" should be --constriction--.

Column 3:

line 61, after "cross-section" insert --of--.

Column 4:

line 56, replace "The portion" with --The end portion--.

Column 5:

line 5, replace "narrows 3b" with --narrows at 3b--.

Claim 1:

Column 5, line 66, delete "between said inner and outer tubes, said inner tube having an end that terminates the tube short of the corresponding end of said outer tube--;

Column 6, bridging lines 11 and 12, "of constriction" should read --of said constriction--.

UNITED STATES PATENT AND TRADEMARK OFFICE
CERTIFICATE OF CORRECTION

PATENT NO. : 4,153,004

DATED : May 8, 1979

INVENTOR(S) : Eike Barnert

Page 2 of 3

It is certified that error appears in the above—identified patent and that said Letters Patent is hereby corrected as shown below:

The sole sheet of drawing should be deleted to appear as per attachment.

Signed and Sealed this

Twenty-fifth Day of December 1979

[SEAL]

Attest:

SIDNEY A. DIAMOND

Attesting Officer

Commissioner of Patents and Trademarks